United States Patent [19]

Bingham et al.

[11] Patent Number: 4,761,780
[45] Date of Patent: Aug. 2, 1988

[54] ENHANCED EFFICIENCY BATCHER-BANYAN PACKET SWITCH

[75] Inventors: Bryan L. Bingham, Parsippany; Chester M. Day, Jr., Randolph; Lanny S. Smoot, Morris Township, Morris County, all of N.J.

[73] Assignee: Bell Communications Research, Inc., Livingston, N.J.

[21] Appl. No.: 945,079

[22] Filed: Dec. 22, 1986

[51] Int. Cl.⁴ ............................................... H04J 3/00
[52] U.S. Cl. ......................................... 370/60; 370/94; 370/86
[58] Field of Search .................. 340/825.05, 825.5; 370/94, 60, 89, 86, 85, 95

[56] References Cited

U.S. PATENT DOCUMENTS

| | | | |
|---|---|---|---|
| 3,855,422 | 12/1974 | Cadiou et al. | 370/86 |
| 4,516,238 | 5/1985 | Huang et al. | 370/94 |
| 4,536,873 | 8/1985 | Leete | 370/86 |
| 4,592,049 | 5/1986 | Killat et al. | 370/94 |

FOREIGN PATENT DOCUMENTS 0146293  6/1985  European Pat. Off. .
0186320  7/1986  European Pat. Off. .

OTHER PUBLICATIONS

"Starlite: A Wideband Digital Switch", Proceedings of the 1984 Globecom Conference, A. Huang and S. Knauer, IEEE, 1984.

L. A. Ronningen, "Architecture of a Very Fast Packet Switch", ISS '84, Florence, May 7-11, 1984, pp. 1-4.

A. Huang et al., "Starlite: A Wideband Digital Switch", IEEE Global Telecommunication Conference Proceedings, 1984, vol. 1, pp. 121-125.

Primary Examiner—Douglas W. Olms
Assistant Examiner—Melvin Marcelo
Attorney, Agent, or Firm—James W. Falk

[57] ABSTRACT

A mechanism is disclosed for resolving conflicts between input ports of a Batcher-Banyan Packet switching network that wish to transmit data packets to the same output port during a particular packet switch cycle. The input ports of the Batcher-Banyon network are connected in a serial ring. Bit positions on the ring represent output ports. Each input port having a data packet to transmit to a particular output port may reserve that output port before the start of the next Batcher-Banyan packet switch cycle by writing a "1" in the ring bit position corresponding to the output port to which the data packet is addressed. If the particular output port has already been reserved by another input port, the data packet is buffered.

9 Claims, 3 Drawing Sheets

ENHANCED EFFICIENCY BATCHER-BANYAN PACKET SWITCH

FIELD OF THE INVENTION

The present invention relates to a packet switch network such as a Batcher-Banyan network and more particularly to a mechanism for resolving conflicts between input ports of such a network that wish to transmit data packets to the same output port in the same packet switch cycle.

BACKGROUND OF THE INVENTION

An important element for providing advanced telecommunications network services requiring large bandwidth is a high capacity packet switch capable of interconnecting a large number of subscriber lines.

Such a packet should include i input ports (i=1,2,3,...) and j output ports (j=1,2,3...). Typically, such a packet switch is synchronous and the packets routed therein are of fixed length. During a packet switch cycle, packets present at the i inputs are routed through the packet switch to particular ones of the j outputs. More particularly, for each packet switch cycle, each input port i may attempt delivery of a packet to a certain output port j.

A packet switching network is internally non-blocking if it can deliver all packets from the input ports i, to the requested output ports j when the output ports are distinct for all input ports i making requests. However, an internally, non-blocking switching network can still block if there are two simultaneous requests for the same output port. In this case, one or both packets directed to the same output port will be blocked or destroyed. Thus, a mechanism to resolve output port conflicts in internally non-blocking packet switching networks is required.

An example of an internally non-blocking switching network is the Batcher-Banyan network, which comprises a Batcher sorting network followed by a Banyan routing network. Batcher-Banyan networks are discussed in detail in A. Huang et al. "Starlite: A Wide Band Digital Switch", Proceedings of the 1984 Globecome Conference.

The Batcher-Banyan network is a self routing network which routes a packet from a particular input port to a particular output port based on a destination address in the packet header. It is known that an internally, non-blocking network results by first sorting the packets in non-decreasing order according to the destination address in a sorter network (e.g., a Batcher network) prior to routing the packets through a Banyan network. The Banyan network routes each packet to the particular output port address contained in the packet header. Unfortunately, blocking occurs in the resulting Batcher-Banyan network if more than one packet is addressed to a particular Banyan output port in any given packet switch cycle.

One particular scheme for resolving such output port conflicts is disclosed in the above-identified Huang et al. reference, which reference is directed to the Starlite switch. In the Starlite switch, the packets are routed through a Batcher sorting network and a Banyan routing network. The Batcher network serves to sort the packets in non-decreasing order according to destination (i.e., Banyan output port) address. At the output of the Batcher network, all but one packet addressed to each output port is purged, so that after purging only packets with unique destination addresses remain. Consequently, at the output of the Batcher network the packet destination addresses are in strictly increasing order, but with holes in the sequence due to purged packets. This sequence with holes can cause packet collisions in the subsequent Banyan network. Consequently, a concentration network is required in front of the Banyan network for skewing all packets toward the top to fill in the holes left by the purged packets. Such concentration networks involve rather complex operations such as counting the numbers of packets above a certain output line of the Batcher network. In general, concentration networks may be as complex as the Batcher network in terms of node counts.

In the Starlite switch, in order to deliver the purged packet, the purged packets are routed from the outputs of the Batcher sorting network to some input ports of the switch which are specially dedicated for re-entry of purged packets. To reduce the number of input ports dedicated to re-entry, the purged packets go through a concentration network.

Thus, the above-described output port conflict resolution scheme suffers from the following shortcomings. First, more than half of the input ports are dedicated for re-entering packets. In addition, the remaining input ports must not be loaded above about 40% to prevent excessive packet loss. The Starlite switch requires two concentration networks, with their associated chip sets and subsystem designs. Lastly, packets may be delivered out of sequence using the Starlite conflict resolution scheme.

Accordingly, it is the object of the present invention to provide a simpler, more efficient scheme for resolving output port conflicts in an internally non-blocking packet switching network such as the Batcher-Banyan network.

SUMMARY OF THE INVENTION

The present invention is a method for resolving conflicts between the input ports of a packet switching network such as a Batcher-Banyan network, which input ports wish to transmit data packets to the same output port in the same packet switching cycle. In accordance with this invention, data packets are buffered at the input ports of the Batcher sorting network. A serial ring connects these input ports together. Bits circulating on the ring represent output ports of the Banyan network. More specifically, bit positions on the ring correspond to the Batcher-Banyan network output port numbers. For example, the third bit position on the ring corresponds to the Batcher-Banyan network output port having the address three and the fifth bit position on the ring corresponds to the output port having the address of five. The bit positions may take on the value of logic "0" or logic "1". Illustratively, logic "0" indicates that no input port has reserved the Banyan network output port corresponding to that bit position on the ring. Similarly, logic "1" at a particular bit position on the ring indicates that an input port has reserved the corresponding output port.

Each input port counts the bit positions on the ring as they pass by. If a particular input port has a packet to send to a particular output port whose number matches the bit position on the ring currently in the input port and the bit in that position on the ring has a value logic "0", then the input port writes a logic "1" into that position to reserve the corresponding output port for its packet. Input ports reserve at most one output port each before the start of the next Batcher-Banyan packet switch cycle. At the start of the next Batcher-Banyan packet switch cycle, input ports with reservations transmit their packets into the Batcher-Banyan packet switching network. All transmitted packets are then guaranteed to be routed through the Batcher-Banyan switch without a collision. Input ports unable to reserve a needed output port buffer their packets until the next round of output port reservations are made before the start of the next subsequent Batcher-Banyan packet switch cycle. The scheme may be adapted to handle packets having different priority classes.

DETAILED DESCRIPTION

Figure 1:
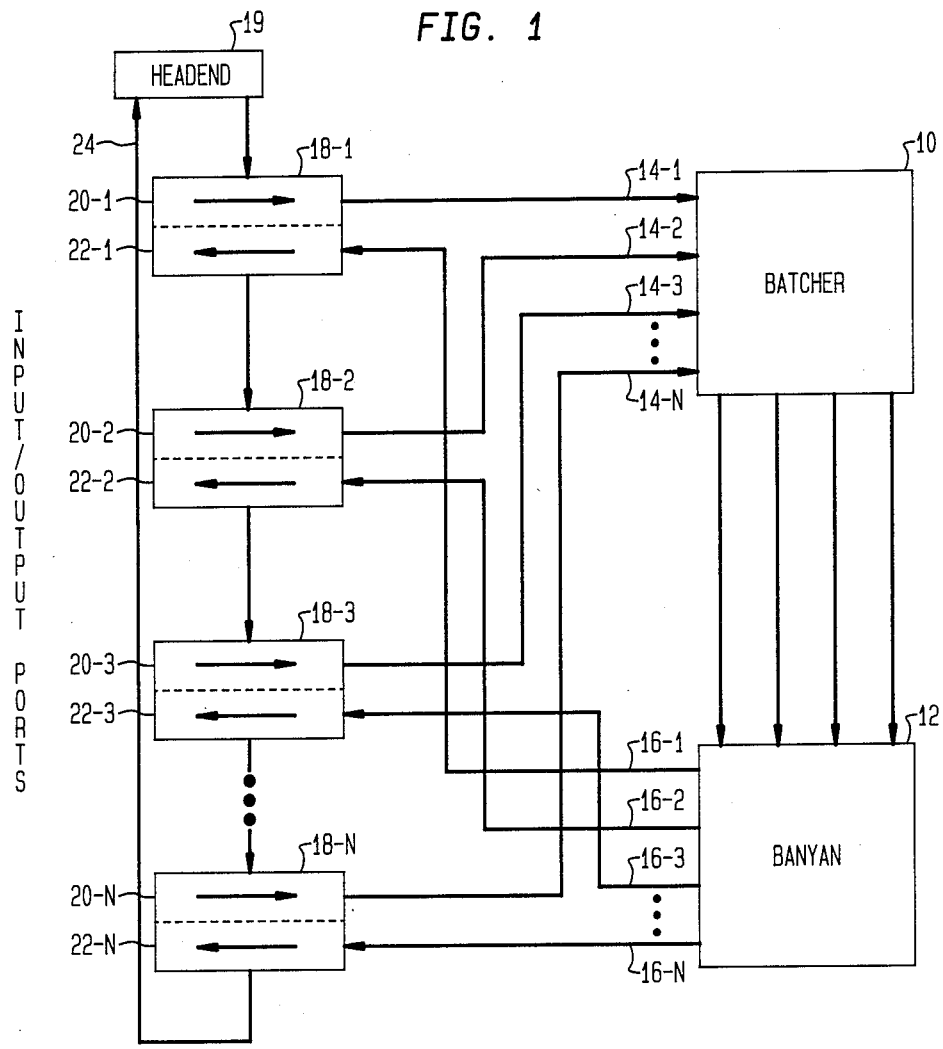
FIG. 1 schematically illustrates a Batcher-Banyan network, whose input ports are connected in a ring-like configuration in accordance with an illustrative embodiment of the present invention.

Turning to FIG. 1, a Batcher-Banyan packet switching network is illustrated. The network of FIG. 1 comprises a Batcher network 10 followed by a Banyan network 12. Data packets enter the Batcher network on the input lines 14-1, 14-2, 14-3, ... 14-N. Data packets leave the Banyan network on the output lines 16-1, 16-2, 16-3, ... 16-N.

Each of the input lines is connected to a port and each of the output lines is also connected to a port. A port is a place where a packet can be delayed or processed before it enters the Batcher-Banyan network or after it leaves the Batcher-Banyan network. Input ports read out packets into the Batcher network and output ports receive packets from the Banyan network. In FIG. 1, the ports illustrated therein are duplex ports. That is, the input and output ports are coupled together and may share some resources. These duplex ports are designated 18-1, 18-2, 18-2, ... 18-N, in FIG. 1. Each of the ports 18-1, 18-2, ... 18-N comprises an input port 20-1, 20-2, 20-3, ... 20-N and an output port 22-1, 22-2, 22-3, ... 22-N. Alternatively, separate input ports and output ports may be used.

As indicated above, the Batcher-Banyan network is a synchronous network. Synchronous can be defined to mean that packets are presented periodically and simultaneously across inputs of the Batcher-Banyan network from where they are synchronously clocked through the network. During each Batcher-Banyan switching cycle, the Batcher network receives packets from the input ports. Each packet contains an address in the packet header and each packet is routed through the Batcher-Banyan network to the output port indicated by the address in the packet header. The combined Batcher-Banyan network is a self-routing network, wherein routing decisions are made based on the content of the packet header. The Batcher network serves to arrange incoming packets in non-decreasing order according to the addresses contained in the packet headers and the Banyan network routes the packets from the Batcher outputs to the appropriate Banyan network output ports.

In the Batcher-Banyan packet switching network of FIG. 1, the duplex ports 18-1, 18-2, 18-3, ... 18-N, are connected in series with a headend circuit 19 to form a ring 24. Bits circulating on the ring represent output ports. The third bit position on the ring corresponds to the third output port, i.e., output port 22-3, and the Nth-bit position on the ring represents Nth output port 22-N. Each bit position may contain either a logic "0" indicating that the corresponding output port is not reserved or a logic "1" indicating that the corresponding output port is reserved. As the bit positions circulate around the ring, each input port keeps track of the bit positions as they pass by. If an input port has a data packet to send to a particular output port whose number matches the bit position on the ring currently at that input port, and the bit in that position on the ring is logic "0" (i.e., it is unreserved), the input port writes a logic "1" into the bit position to reserve the corresponding output port for its data packet. Input ports reserve at most one output port each before the start of the next Batcher-Banyan packet switch cycle. When the next Batcher-Banyan packet switch cycle starts, input ports with reservations transmit their packets into the Batcher-Banyan packet switch network. All transmitted packets are guaranteed to route through the Batcher-Banyan packet switch without conflict.

Figure 2:
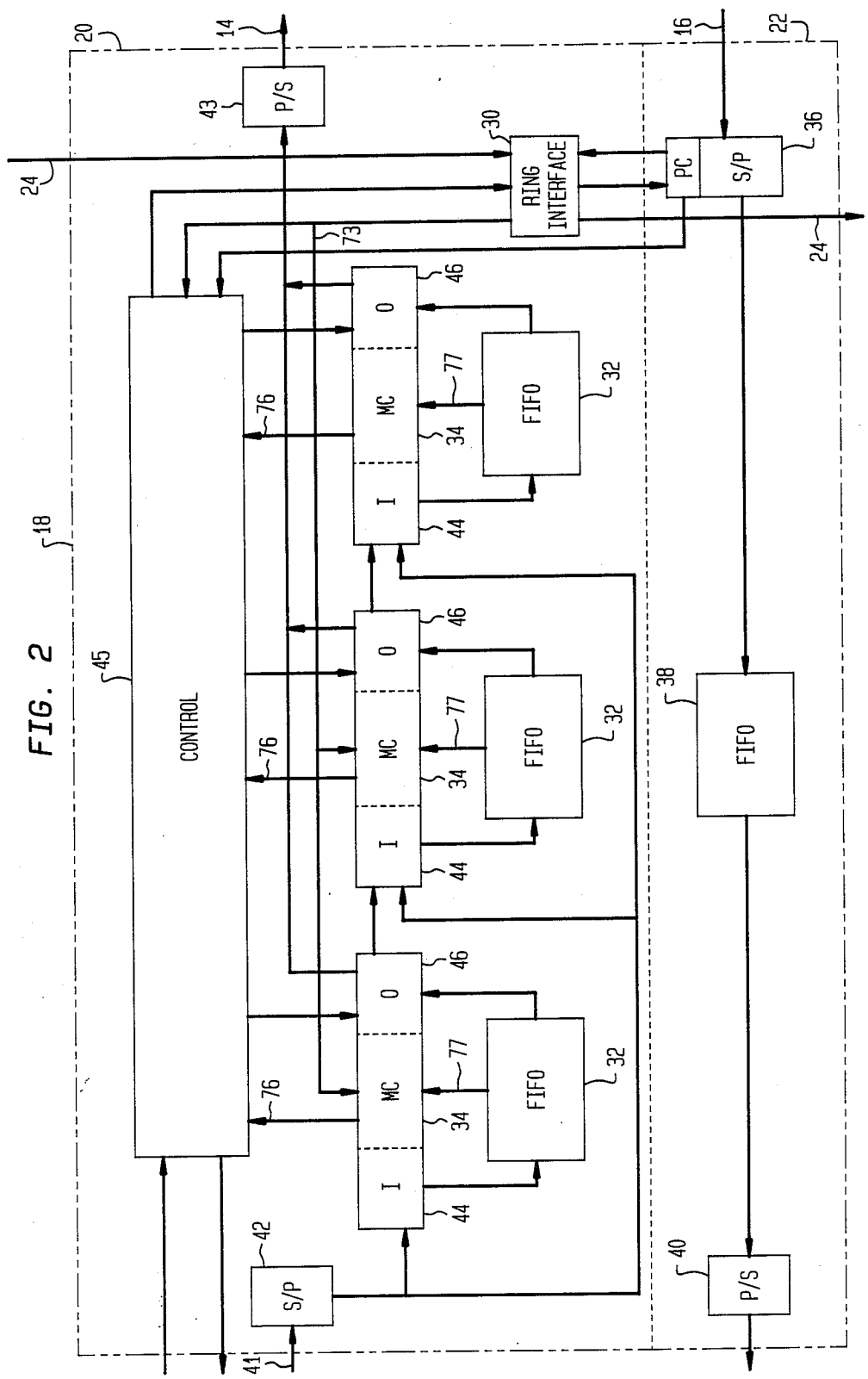
FIG. 2 illustrate a duplex port for use in connection with the network of FIG. 1.

Turning to FIG. 2, a bidirectional input/output port 18 is schematically illustrated. The port 18 includes an input port portion 20 and an output port portion 22. The input port portion 20 includes a ring interface 30 which signals the rest of the port when a valid ring bit position arrives and indicates what number bit position it is. The input port portion 20 also includes shift registers or FIFOs 32 which contain buffered data packets. A data packet entering the port 18 on the line 41 is routed into a FIFO 32 by means of serial to parallel converter 42 and input circuitry 44. Illustratively, there is one buffered packet per FIFO. Each match circuit 34 contains a copy of the header of the packet currently in the corresponding FIFO 32. The control circuitry 45 includes a state machine used to run the port. Packets are read out of the FIFO's 32 by means of output circuitry 46 and the parallel to serial converter 43. The packets then enter the Batcher network by means of input line 14.

The output port portion 22 of the port 18 contains little more than what is needed to transmit a packet out of the Batcher-Banyan network. Thus, the output port 22 receives packets from the network on the output line 16. These packets are received in the port by means of serial to parallel converter 36 and are buffered in FIFO 38. The packets are transmitted out of the port by means of parallel to serial converter 40.

Bits circulating on ring 24 are passed from ring interface 30 in one port 18 to ring interface 30 in the next port 18. After a packet arrives at the port 18 of FIG. 2 and is stored in one of the FIFO's 32, the address contained in the packet header is matched against a counter (shown in FIG. 5) which is incremented every time a valid ring bit position arrives at a ring interface 30. All packet address headers stored in the port are matched against the current ring bit position (as indicated by the counter) simultaneously. If there is a match, and the ring bit received is a logic "0", indicating that the corresponding output port is free, a logic "1" is written into the bit position to reserve the corresponding output port for the next Batcher-Banyan packet switch cycle. If there is no match the unmodified ring bit is simply written out on the ring 24 to the next port. At the start of the next Batcher-Banyan packet switch cycle, when the Batcher network is ready to accept new packets, all input ports with reserved output ports start to send their packets into the Batcher-Banyan packet switch network. The input port 20 of the FIG. 2 is capable of sending a packet from any of its FIFOs 32 to the Batcher network. It need not send strictly the oldest. However, if two or more packets from one port are addressed to the same output port, the oldest is sent first to insure correct sequencing of packets through the Batcher-Banyan packet switch network. At the start of the next cycle of ring bits and through use of control circuitry 45 each port resets the ring bit it presently has to 0 (unless the corresponding output port was unreserved and the bit position already has the value zero). This indicates that the corresponding output port is now free to be reserved by another input port including the input port that presently has the bit. However, an input port cannot reserve the same output port for two successive Batcher-Banyan packet switching cycles, unless all other input ports have first had a chance to reserve the particular output port before the start of the second Batcher-Banyan cycle. In other words, an input port must give all other input ports a chance to reserve a particular output before reserving that port again for itself. This helps to insure that the output ports are shared fairly among all input ports. Note that the ring 24 does not have to be coupled to the rest of the Batcher-Banyan packet switch in terms of speed and clock. The ring runs at a given speed and does not stop. A packet can arrive at an input port at any time and be immediately selected for output at the start of the next Batcher-Banyan cycle, even if it is still being written into its FIFO while being read out into the Batcher network.

The hardware elements schematically illustrated in FIG. 1 and 2 are now discussed in somewhat greater detail. The main function of the ring interface 30 of FIG. 2 is to receive ring bit positions from the ring interface in the adjacent upstream port. When a bit position is received, the ring interface outputs a signal indicating a valid ring bit is received. This causes counters in the match circuits 34 and in the control circuitry 45 to be increased. The ring interface also reads each bit on the ring and outputs a signal indicating whether the corresponding output port has been previously reserved by an upstream input port. Based on information received, logic in the control circuitry 45 communicates with the ring interface to tell the ring interface whether to write the bit position in ring interface 30 out unchanged or to change a logic "0" value in a bit position to a logic "1", so as to reserve a particular output port for the input port. The interface may also include a synchronization line which is used to initialize and check the port counters. The first ring bit after a pulse on the synchronization line is the bit corresponding to the first output port. If the output port counters do not agree with the synchronization pulse an error signal is generated which can be used to reset the counters. In an alternative embodiment of the invention, each ring interface may be adapted to receive the bit written out by the immediately adjacent upstream ring interface as well as the bit written out by the ring interface preceding the immediately adjacent upstream ring interface. This arrangement is used to check malfunctioning ring interfaces and enables the ring to continue to function in the presence of a malfunctioning ing interface. The optical analogue of such a ring configuration is disclosed in Haller-Smoot U.S. application Ser. No. 813,386 filed on Dec. 26, 1985 and assigned to the assignee hereof. This application is incorporated herein by reference.

Figure 3:
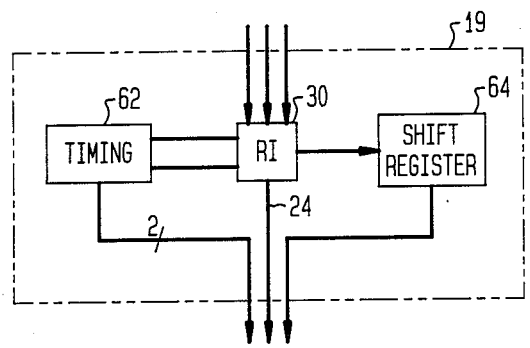
FIG. 3 illustrates a headend circuit for the ring-like configuration of FIG. 1.

The headend 19 of the ring 24 is shown in greater detail in FIG. 3. The headend is responsible for generating timing sequences for the ring and for insuring that there are as many bits on the ring as there are output ports. Timing is generated by means of timing circuitry 62. The headend also includes a shift register 64 which is used to introduce as many bit delays as are necessary for the ring to hold the appropriate number of bit positions. In other words, the shift register 64 is used to set up the ring bit positions on the ring 24. In a switch with all output ports in use, there is still a one bit delay in the headend. The bit associated with that delay is a synchronization bit which is read by the ring interfaces as the synchronization pulse and is not considered a valid ring bit position by the ring interfaces. This means that for N-output ports, the ring includes N+1 bit positions. The headend 19 also includes a ring interface 30 which receives ring bit positions from port 20-N and transmits ring bit positions to port 20-1.

Figure 4:
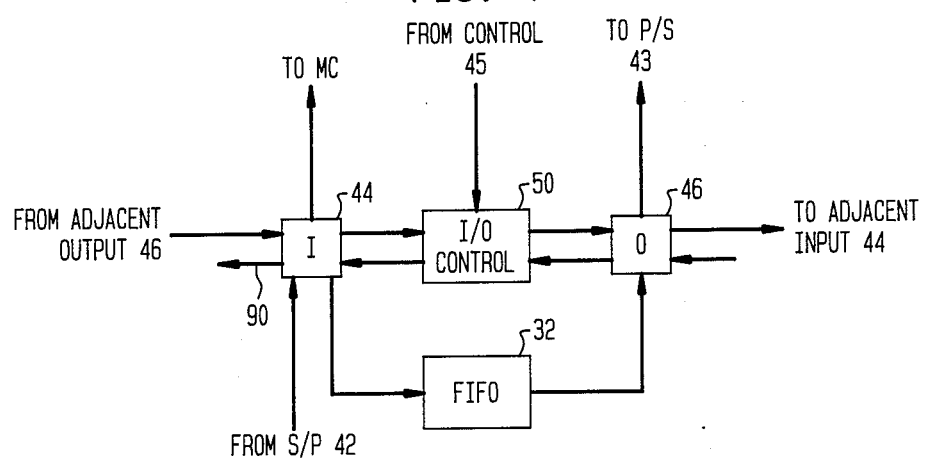
FIG. 4 illustrates input/output circuitry for use in connection with a first-in-first-out (FIFO) memory contained in the port of FIG. 2.

The serial to parallel converter 42 and the parallel to serial converter 43 are standard devices. The FIFOs or shift registers 32 are also standard devices. When a packet is read out of a FIFO to the Batcher network, the full FIFOs to the left of it transfer their packets to the next FIFO to the right. The FIFO input-output (I/O) circuits 44 and 46 are shown in more detail in FIG. 4. An I/O control circuit 50 contains two state bits, one bit to tell if there is a packet in the associated FIFO 32 and one bit to tell if there is a packet in the FIFO to the right. The input circuit 44 latches between the serial to parallel converter 42 and the output circuit 46. The input circuit 44 accepts a packet from the serial to parallel converter 42 only if its associated FIFO is empty and its right hand neighboring FIFO is full. Each output circuit 46 latches between the output parallel to serial interface 43 and the input circuit to its left. At the end of a Batcher-Banyan packet switch cycle, while the last bit is being given to the parallel to serial converter 43 leading to the Batcher network 10, the control 45 sends a command to each FIFO input-output (I/O) unit 50 telling it what to do. The two WE (write, enable) lines are used for this purpose. The commands that the I/O can receive from the control 45 include 1) do nothing, 2) if full, write FIFO into right hand neighbor, and 3) write FIFO out to parallel to serial converter. Each FIFO I/O unit sets a state bit of its left hand neighbor to its own state by means of line 90. The purpose of this is to keep buffered packets closer to the right and never to have holes, i.e., empty FIFOs between full ones. Arriving packets should not be delayed, even by one byte time at the input serial to parallel converter.

Figure 5:
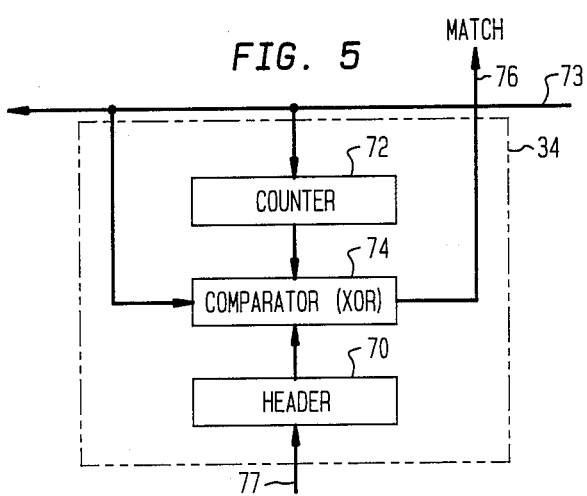
FIG. 5 illustrates a matching circuit for use in the port of FIG. 2.

The match circuit 34 is schematically illustrated in FIG. 5. It contains a register 70 that has a copy of the header bits of the packet currently in the associated FIFO. Such headers are transferred over leads 77. This copy is made when the data packet is first transferred into the FIFO. The counter 72 is driven by a line from the ring interface which indicates when a valid ring bit position is received. When a valid ring bit position is received by the ring interface, the counter 74 in the match circuit 34 is incremented and the values of the count and the header are compared by means of comparator 74. If there is a match the matchline 76 is strobed. This operation never ceases except when a new header value is loaded into the header register by the input circuit. Then the matchline is disabled, since the register value may be indeterminate during that time. The counter 72 is always increased when a new ring bit position is received by the ring interface.

In an alternative embodiment of the invention, the input port may be implemented using a VLSI chip. In this case, the chip includes a content-addressable memory for storing packet headers and a counter for maintaining the count of ring bit positions. The packets themselves are stored in a conventional RAM. The chip also includes a processor for running the above described algorithm involving a comparison between the packet headers and the count maintained in the counter followed by writing a logic "1" into a bit position on the ring if a match is found between a header and the count and the corresponding output port has not been previously reserved. If a match is found, the packet is transmitted from the RAM into the Batcher-Banyan network and the corresponding header is deleted from the content addressable memory.

The Batcher-Banyan packet switch network using the ring reservation scheme discussed herein can be expected to cause all packets to suffer on average the same amount of delay for a given traffic load. The reason for this is that every packet is treated exactly the same. However, the variance of this delay increases as the load on the packet switch increases, since it becomes more likely that one of the new packets in a port will reserve an output port before the oldest has a chance to do so and it becomes more likely that the output port desired by the oldest packet will have been reserved by another port upstream. An enhancement of the algorithm discussed above may be used to eliminate this problem and reduce both the average delay and the variance of the delay for a given traffic load. In the enhanced algorithm, the ring completely cycles through all of the input ports more than once to prepare for each upcoming Batcher-Banyan packet cycle. During the first time around for the ring bits, an input port may make a reservation only for its oldest packet. Moreover, an input port cannot reserve the same output port for two consecutive Batcher-Banyan packet switch cycles unless all other ports have had a chance to reserve the output port first. After one complete cycle of the ring bits, the oldest data packets that could reserve an output port have done so. For the rest of the time before the start of the next Batcher-Banyan cycle, the input ports can reserve previously unreserved output ports for any packets they have left.

This algorithm reduces the average delay for the oldest packet, since the oldest packets compete only among themselves for output ports during the first cycle of the bit positions around the ring. The chance of a successful reservation is greatly increased and is not dependent on the total load on the switch. Younger packets have less of a chance of reserving a slot than before, but because the throughput of the port is better at high loads with this algorithm, they will become the oldest packets sooner and the overall packet delay is less. Finally, the switch throughput remains high, since under heavy loads it is likely that almost every output port will be utilized during every Batcher-Banyan packet switch cycle.

In another alternative, priority classes can be implemented for the Batcher-Banyan packet switching network, so that higher priority packets are transmitted before lower priority packets. This is accomplished by providing each header with a priority field. Thus, in a first cycle of ring bits before the start of a Batcher-Banyan packet switching cycle, only high priority packets can reserve an output port. In a second cycle of ring bits lower priority packets can attempt to reserve output ports not previously reserved by the high priority packets in the first ring bit cycle.

The speed at which the ring 24 is run is important to the performance of the entire Batcher-Banyan packet switch. Even in the simplest algorithm discussed above, each bit on the ring must pass through all input ports at least once prior to the start of the Batcher-Banyan packet cycle. Therefore, the ring must rotate completely in less time than the duration of one Batcher-Banyan packet switching cycle. The duration of the network switching cycle is determined by the length of the data packets. The number of the bits on the ring (N+1) exceeds the number of output ports (N) by one. It follows that if N+1 is greater than the packet size in bits, then the ring must run faster than the rest of the switch to do its job. If this is not acceptable, N+1 will have to be limited to less than the packet size or the packet size must be increased which may cause problems in certain applications.

In another embodiment of the invention, the ring may be more than one bit wide; that is, each position of the ring may contain 2 or more bits. One bit is always the reservation bit, as before. The other bits can be used to implement priority classes in the Batcher-Banyan switching network. Each packet has a priority class contained in its header, along with the output port address. An input port may reserve an output port by writing a logic "1" into one ring bit, and writing the priority of the packet into the other bits of the ring position. If an input port with a higher priority packet matches the same output port, it writes over the priority field in the ring position so as to reserve the corresponding output port for itself. At some time before the start of the next Batcher-Banyan cycle all ports stop reserving packets. The ring then circulates through once so all ports can determine if they have successfully reserved an output port.

Another alternative algorithm for rings greater than one bit wide allows logical addresses to be assigned to one or more output ports. Here, along with a reservation bit, each ring position carries a logical address that is matched with logical addresses contained in the packet headers. (This is instead of matching the ring bit position count with the packet header). When a match is found the input port replaces the logical address in the packet header with the physical output port address implicit in the current ring position. This allows traffic destined for one logical destination to be routed evenly over a number of different outgoing links.

Both schemes above can be implemented at the same time to produce a Batcher-Banyan switching network with priority classes and logical addressing.

In short, the above-described ring reservation scheme for resolving output port conflicts in a Batcher-Banyan packet switching network is an efficient scheme that can be implemented using the same technology as the rest of the Batcher-Banyan network. It requires substantially no switch overhead. Finally, the above-described embodiments of the invention are intended to be illustrative only. Numerous alternative embodiments of the invention may be devised by those skilled in the art without departing from the spirit and scope of the following claims.

What is claimed is:

1. A packet switch comprising
a plurality of input ports interconnected in a ring-like configuration,
a plurality of output ports, and
a self-routing switch network for routing packets present at said input ports to particular output ports depending on addresses contained in said packets,
said ring-like configuration of input ports being adapted to circulate a plurality of bits including one bit corresponding to each of said output ports, each of said input ports being adapted to read said bits to determine if a particular output port is available for a packet and to write said bits to reserve a particular output port for a packet.

2. A packet switch comprising
a plurality of input ports interconnected in a ring-like configuration,
a plurality of output ports, and
a self-routing switch network for routing packets present at said input ports to particular output ports depending on addresses contained in said packets,
said switch network comprising a Batcher sorting network followed by a Banyan routing network,
said ring-like configuration of input ports being adapted to circulate a plurality of bits including one bit corresponding to each of said output ports, each of said input ports being adapted to read said bits to determine if a particular output port is available for a packet and to write said bits to reserve a particular output port for a packet.

3. The packet switch of claim 2 wherein at least one of said input ports comprises:
a counter for maintaining a current count of the bit positions circulating around the ring to determine the output port to which the current bit position in said one input port corresponds;
means for comparing the current count with the output port address of at least one packet stored in said one input port to determine if the packet is to be routed to the output port corresponding to the current bit position, and
means for writing information into the current bit position to reserve the output port corresponding to the current bit position if the current bit position indicates the corresponding output port has not been previously reserved and if said one packet is to be routed to the corresponding output port.

4. The packet switch of claim 3 wherein each of said input ports comprises a FIFO memory for storing said at least one packet.

5. The packet switch of claim 3 wherein each of said input ports includes a memory means for storing a plurality of packet headers to be compared with said current count.

6. A method for routing data packets through a packet switching network interconnecting a plurality of input ports arranged in a ring-like configuration with a plurality of output ports, said method comprising the steps of:
circulating a plurality of bit positions around said ring-like configuration in input ports, one bit position corresponding to each of said output ports,
at each input port, reading said bit positions to determine if the corresponding ports have been previously reserved, and
at each input port, selectively writing one of said bit positions to reserve a previously unreserved output port for a packet.

7. A method for routing data packets through a packet switching network interconnecting a plurality of input ports arranged in a ring-like configuration with a plurality of output ports, said method comprising the steps of,
circulating a plurality of bit positions around said ring-like configuration of input ports, one bit position corresponding to each of the output ports,
at each input port, maintaining a current count of bit positions to identify the current bit position at each input port,
at each input port, comparing the current count with the address of a packet stored therein, to determine if the packet is to be routed to the output port corresponding to the current bit position,
at each input port, writing information into the current bit position to reserve the output port corresponding to the current bit position if the current bit position indicates the corresponding output port has not been previously reserved and said comparison step indicates said packet is to be routed to said corresponding output port, and
transmitting data packets from said input ports successfully reserving output ports through said network.

8. The method of claim 7 wherein each of said bit positions are cycled around said ring twice before data packets are transmitted through said network, during said first cycle input ports containing packets of a first priority are able to reserve an output port and during said second cycle input ports containing packets of a second priority are able to reserve an output port.

9. A method for routing data packets through a packet switching network interconnecting a plurality of input ports arranged in a ring-like configuration with a plurality of output ports, each of said packets including a logical address, said method comprising the steps of:
circulating a plurality of ring-positions around said ring-like configuration of input ports, each ring position corresponding to one of said output ports and containing a logical address, and
at each input port, comparing said logical address contained in the current ring but position with said logical address information contained in a stored data packet, and if there is a match, replacing said logical address contained in the stored packet with the address of the output port corresponding to the current ring position.

* * * * *